United States Patent
Kimura et al.

(10) Patent No.: US 8,315,075 B2
(45) Date of Patent: Nov. 20, 2012

(54) DC/AC CONVERTER

(75) Inventors: Kengo Kimura, Niiza (JP); Toru Ashikaga, Niiza (JP); Toshihiro Nakano, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 680 days.

(21) Appl. No.: 12/561,765

(22) Filed: Sep. 17, 2009

(65) Prior Publication Data

US 2010/0073976 A1    Mar. 25, 2010

(30) Foreign Application Priority Data

Sep. 19, 2008   (JP) ................................. 2008-241190

(51) Int. Cl.
*H02M 3/24* (2006.01)
*H02M 3/335* (2006.01)

(52) U.S. Cl. .......................................... 363/98; 363/17
(58) Field of Classification Search .................... 363/17, 363/21.02, 97, 98, 131, 132
See application file for complete search history.

(56) References Cited

U.S. PATENT DOCUMENTS

| | | | | |
|---|---|---|---|---|
| 6,418,038 B2 * | 7/2002 | Takahama et al. | ............... | 363/17 |
| 6,483,721 B2 * | 11/2002 | Terashi | ............... | 363/17 |
| 7,375,987 B2 * | 5/2008 | Kyono | ............... | 363/21.02 |
| 7,446,512 B2 * | 11/2008 | Nishihara et al. | ............... | 323/233 |
| 2010/0066261 A1 | 3/2010 | Kimura | | |

FOREIGN PATENT DOCUMENTS

JP         2001-258268       9/2001

* cited by examiner

*Primary Examiner* — Matthew Nguyen
(74) *Attorney, Agent, or Firm* — Oblon, Spivak, McClelland, Maier & Neustadt, L.L.P.

(57) ABSTRACT

A DC/AC converter includes: a resonant circuit including a transformer having a primary winding and a secondary winding and at least one capacitor, in which the capacitor is connected to at least one of the primary winding and secondary winding of the transformer, and an output terminal to which the load is to be connected is provided on the secondary winding side; a switching circuit connected to both ends of a direct current power supply and having a bridge configuration composed of switching elements for flowing a current through the primary winding of the transformer and the capacitor in the resonant circuit; and a control circuit that turns on/off the switching elements by a pair of drive signals, and flows a current through the load bidirectionally, thereby performs a PWM control for the current flowing through the load, wherein the control circuit includes step drive circuits which turn on the switching elements in steps, and the step drive circuits are provided so as to individually correspond to the switching elements.

6 Claims, 8 Drawing Sheets

DC/AC CONVERTER

BACKGROUND OF THE INVENTION

1. Field of the Invention

The present invention relates to a DC/AC converter that converts a direct current into an alternating current and supplies alternating current power to a load.

2. Description of the Related Art

In an inverter circuit that composes a DC/AC converter from a bridge circuit such as a half-bridge circuit and a full-bridge circuit, and supplies power to a load, when switching elements such as MOSFETs which compose the bridge circuit and are connected in series in a longitudinal direction are turned on simultaneously, a pass-through current flows through the bridge circuit, and the switching elements are broken.

For the purpose of preventing the switching elements from being turned on simultaneously, in usual, there is known a method of providing a dead time to a gate drive signal for driving the switching elements. However, by this method, the switching elements cannot be prevented from being turned on simultaneously in the case where noise is superimposed on the gate drive signal.

Japanese Patent Laid-Open Publication No. 2001-258268 (Patent Publication 1) discloses a half-bridge-type inverter circuit that prevents the switching elements from being turned on simultaneously by the noise.

This inverter circuit includes: a half-bridge-type switching circuit including a high-side switching element and a low-side switching element; a drive circuit that outputs an output signal driving the switching circuit and having a dead time period provided therein; a high-side dead time control circuit and a low-side dead time control circuit, each of which creates the dead time period from an input signal of the drive circuit; a pulse generator that generates a set output signal and a reset output signal from an output of the high-side dead time control circuit; a level shift circuit that boosts the set output signal and the reset output signal; a pulse filter circuit that allows passage of the set output signal and the reset output signal, of which pulse width has a fixed value or more; and an output circuit that outputs a high-side output signal by the set output signal and reset output signal from the pulse filter circuit, and an output circuit that outputs a high-side output signal by an output of the low-side dead time control circuit. Then, when a pulse width of the output of the high-side dead time control circuit is narrow, and the reset output signal of the pulse generator is not outputted, the pulse filter circuit does not allow the passage of the set output signal. With such a configuration, the inverter circuit of Patent Publication 1 prevents both of the switching elements from being turned on simultaneously.

SUMMARY OF THE INVENTION

However, the half-bridge-type inverter circuit disclosed in Patent Publication 1 cannot completely prevent the breakage of the switching elements, which is caused by the following phenomenon.

Specifically, the MOSFET to be used as the switching element has a parasitic diode (body diode) in terms of structure thereof. In a resonant-type inverter circuit, in the case where a switching circuit thereof is driven at a drive frequency lower than a circuit resonant frequency, when the high-side switching element and the low-side switching element are turned off simultaneously, the parasitic diode of the high-side switching element is turned on. Then, a recovery (reverse) current flows through the high-side switching element.

At this time, when the low-side switching element through which the recovery current does not flow is turned on, the pass-through current unfavorably flows through the switching circuit. Specifically, since each of the parasitic diodes has a reverse recovery time trr, the parasitic diodes are not turned off instantaneously at the time of being reverse biased, and a reverse current will flow therethrough. It is possible that the switching elements may be broken by the reverse current flowing therethrough at this time.

The present invention provides a DC/AC converter capable of preventing the breakage of the switching elements, which is caused by the reverse current generated by the noise and the reverse recovery time of each of the parasitic diodes present in the switching elements.

In order to solve the above-described problems, a DC/AC converter according to a first aspect of the present invention is a DC/AC converter for converting a direct current into an alternating current, and supplying power to a load, the DC/AC converter including: a resonant circuit including a transformer having a primary winding and a secondary winding and at least one capacitor, in which the capacitor is connected to at least one of the primary winding and secondary winding of the transformer, and an output terminal to which the load is to be connected is provided on the secondary winding side; a switching circuit connected to both ends of a direct current power supply and having a bridge configuration composed of switching elements for flowing a current through the primary winding of the transformer and the capacitor in the resonant circuit; and a control circuit that turns on/off the switching elements by a pair of drive signals, and flows a current through the load bidirectionally, thereby performs a PWM control for the current flowing through the load, wherein the control circuit includes step drive circuits which turn on the switching elements in steps, and the step drive circuits are provided so as to correspond to at least one of the switching elements.

In such a configuration, it is preferable that each of the step drive circuits include: a first-step drive circuit that connects a constant current source in series to a first CMOS inverter, and outputs a first drive signal slightly larger than a threshold voltage of the switching element to the switching element; and a second-step drive circuit that connects a delay circuit to an output of a second CMOS inverter, and outputs a second drive signal, of which value becomes a predetermined one, to the switching element.

The switching circuit may be a half-bridge circuit composed of two switching elements. In this case, each of the step drive circuits provided so as to correspond to each of the two switching elements turns on each of the two switching elements in steps.

Alternatively, the switching circuit may be a full-bridge circuit composed of: a first low-side switching element and a first high-side switching element, which are connected in series to each other; and a second low-side switching element and a second high-side switching element, which are connected in series to each other. In this case, the step drive circuits provided so as to individually correspond to the first low-side switching element and the second low-side switching element turn on the first low-side switching element and the second low-side switching element, respectively in steps.

In accordance with the DC/AC converter according to the first aspect of the present invention, each of the step drive circuits provided so as to correspond to the switching elements turns on the switching element in steps. Accordingly, the pass-through current, which flows by the reverse recovery time of each of the parasitic diodes present in the switching elements, can be reduced. Therefore, the breakage of the switching elements, which occurs by the noise and the reverse recovery time of each of the parasitic diodes present in the switching elements, is prevented.

DETAILED DESCRIPTION OF THE EMBODIMENTS

Figure 1:
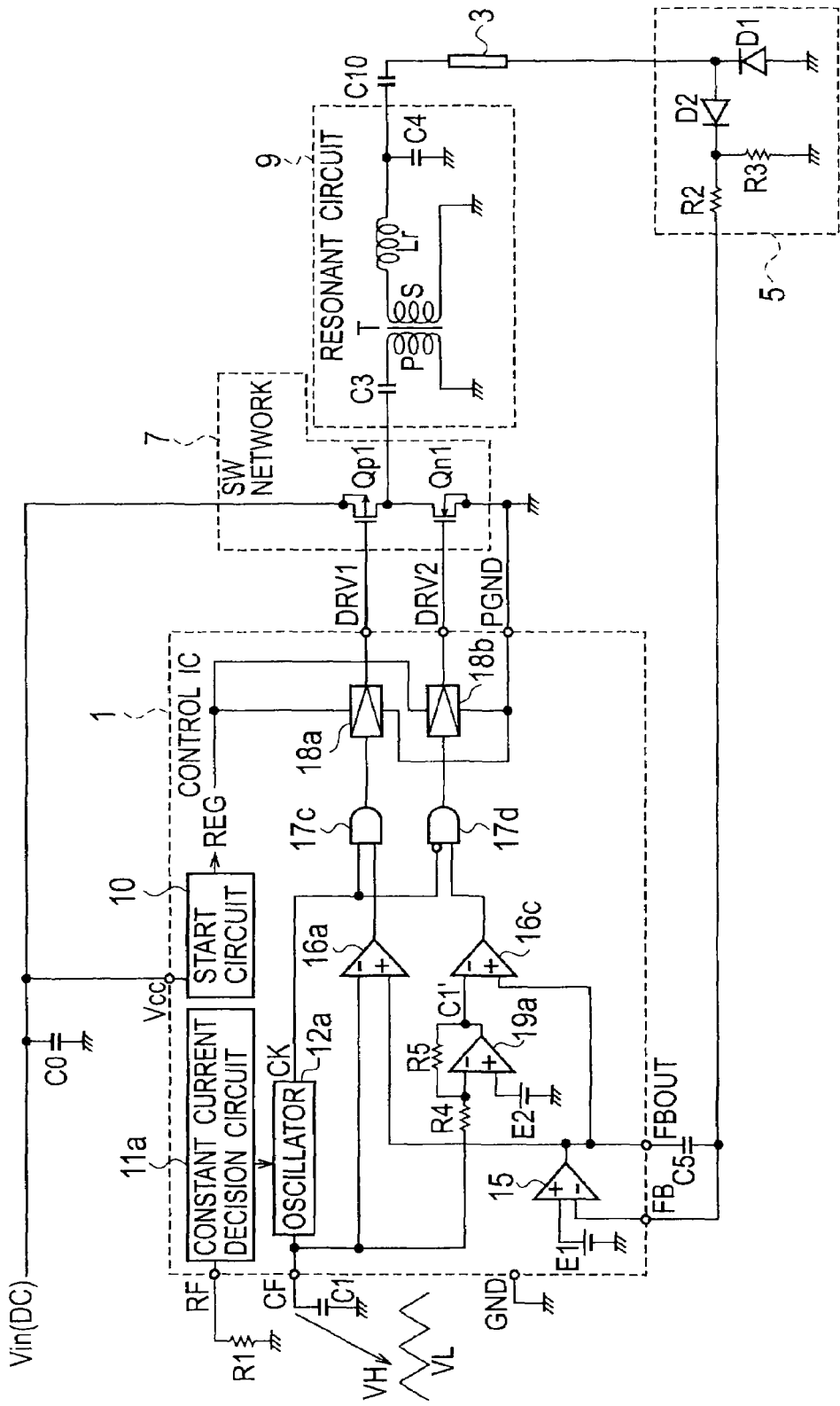
FIG. 1 is a circuit diagram showing a configuration of a DC/AC converter according to Embodiment 1 of the present invention.

A description will be made below in detail of embodiments of a DC/AC converter of the present invention while referring to the drawings.

Embodiment 1

A DC/AC converter according to Embodiment 1 of the present invention, which is shown in FIG. 1, is a device for converting a direct current into an alternating current, and supplying alternating current power to a load. Here, as an example, it is illustrated that the load is a discharge lamp, and that the DC/AC converter is applied to a discharge lamp lighting device.

The DC/AC converter of Embodiment 1 does not prevent switching elements from being turned on simultaneously, but prevents a breakage of the switching elements, which is caused by a pass-through current, and is characterized in that step-drivers are used in a control circuit.

In FIG. 1, a first series circuit composed of a high-side P-type MOSFET Qp1 and a low-side N-type MOSFET Qn1 is connected between a direct current power supply Vin and the ground. The first series circuit composed of the P-type MOSFET Qp1 and the N-type MOSFET Qn1 compose a half-bridge-type switching circuit (SW network) 7. A series circuit composed of a capacitor C3 and a primary winding P of a transformer T is connected between a node of the P-type MOSFET Qp1 and N-type MOSFET Qn1 and the ground GND. A series circuit composed of a reactor Lr and a capacitor C4 is connected to both ends of a secondary winding S of the transformer T. The series circuit composed of the capacitor C3 and the transformer T, the series circuit composed of the reactor Lr and the capacitor C4, and the secondary winding S of the transformer T compose a resonant circuit 9.

The direct current power supply Vin is supplied to a source of the P-type MOSFET Qp1. A gate of the P-type MOSFET Qp1 is connected to a DRV1 terminal of a control IC 1. A gate of the N-type MOSFET Qn1 is connected to a DRV2 terminal of the control IC 1.

Note that a capacitor C10 is connected between the reactor Lr and the load (discharge lamp) 3. In Embodiment 1, both of the capacitor C3 and the capacitor C10 are provided; however, for example, only either one of the capacitor C3 and the capacitor C10 may be provided.

One end of the capacitor C10 is connected to one of electrodes of the discharge lamp 3. The other electrode of the discharge lamp 3 is connected to a lamp current detection circuit 5. The lamp current detection circuit 5 is composed of diodes D1 and D2 and resistors R3 and R4. The lamp current detection circuit 5 detects a current flowing through the discharge lamp 3, and outputs a voltage proportional to the detected current to an inverting input terminal of an error amplifier 15 through a feedback terminal FB of the control IC 1.

The control IC 1 includes a start circuit 10, a constant current decision circuit 11a, an oscillator 12a, the error amplifier 15, a subtractor 19a, first and second PWM comparators 16a and 16c, a first AND gate 17c, a second AND gate 17d, and first and second step-drivers 18a and 18b. The constant current decision circuit 11a is connected to one end of a constant current value decision resistor R1 through an RF terminal. The oscillator 12a is connected to one end of a capacitor C1 through a CF terminal.

Figure 4:
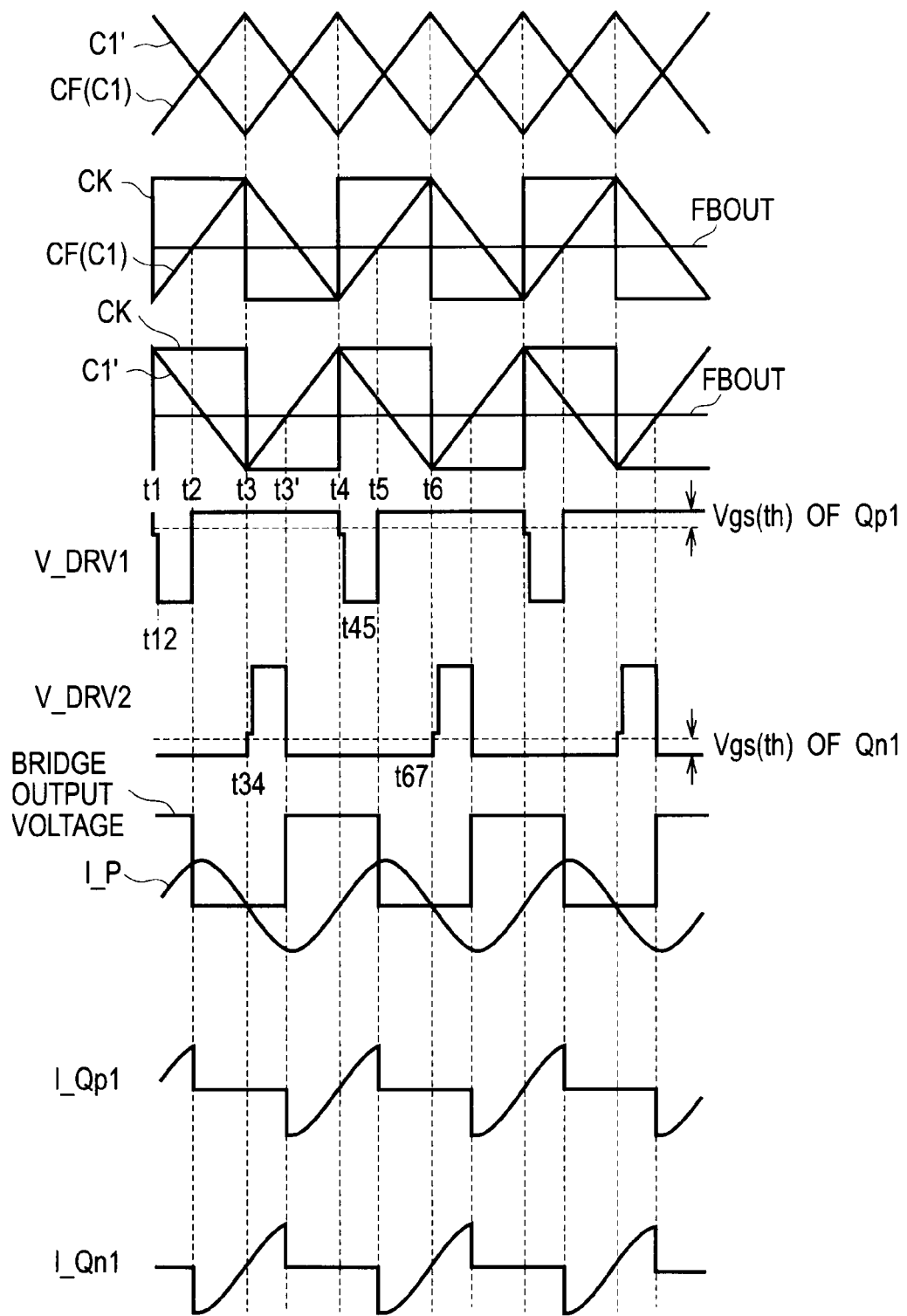
FIG. 4 is a chart showing drive waveforms of an SW network provided in the DC/AC converter according to Embodiment 1 of the present invention, and operation waveforms when the SW network is driven at a resonant frequency.

The constant current decision circuit 11a flows a constant current, which is set arbitrarily by the constant current value decision resistor R1, trough the oscillator 12a. The oscillator 12a charges and discharges the capacitor C1 by the constant current of the constant current decision circuit 11a, and generates a triangular wave signal CF(C1) (that indicates a charge/discharge voltage of the capacitor C1 at a terminal CF) that is as shown in FIG. 4. Moreover, the oscillator 12a creates a clock CK based on the triangular wave signal CF(C1), and sends the clock CK to the first AND gate 17c and the second AND gate 17d. In the triangular wave signal CF(C1), a rising slope thereof and a falling slope thereof are the same. The rising slope and falling slope of the triangular wave signal CF(C1) are set by values of the capacitor C1 and the resistor R1.

The error amplifier 15 amplifies an error voltage FBOUT between the voltage from the lamp current detection circuit 5, which is inputted to the inverting input terminal, and a reference voltage E1 inputted to a noninverting input terminal thereof. An output terminal of the error amplifier 15 is connected to noninverting input terminals of the first and second PWM comparators 16a and 16c. A resistor R5 is connected between an inverting input terminal and output terminal of the subtractor 19a.

The subtractor 19a converts the triangular wave signal CF(C1) into an inverted voltage C1' (shown in FIG. 4)

obtained by inverting the triangular wave signal CF(C1) at a midpoint potential between an upper limit value VH and lower limit value VL thereof, and outputs the inverted voltage C1'. This inverted voltage C1' is inputted to an inverting input terminal of the second PWM comparator 16c. A reference voltage E2 inputted to a noninverting input terminal of the subtractor 19a is equal to (VL+VH)/2, and gives the midpoint potential between the upper limit value VH and lower limit value VL of the triangular wave signal CF(C1).

The second PWM comparator 16c creates a pulse signal that rises to an H level when the error voltage FBOUT from the error amplifier 15, which is inputted to the noninverting terminal, is equal to or more than the inverted voltage C1' from the subtractor 19a, which is inputted to the inverting input terminal, and drops to an L level when the error voltage FBOUT is less than the inverted voltage C1'. Then, the second PWM comparator 16c outputs the created pulse signal to the second AND gate 17d. The second AND gate 17d takes AND of an inverted signal of the clock CK from the oscillator 12a and the signal from the second PWM comparator 16c. Then, an output of the second AND gate 17d is inputted to the N-type MOSFET Qn1 through the second step-driver 18b.

The first PWM comparator 16a creates a pulse signal that rises to the H level when the error voltage FBOUT from the error amplifier 15, which is inputted to the noninverting input terminal, is equal to or more than a voltage of the triangular wave signal from the CF terminal, which is inputted to the inverting input terminal, and drops to the L level when the error voltage FBOUT is less than the voltage of the triangular wave signal. Then, the first PWM comparator 16a outputs the created pulse signal to the first AND gate 17c.

The first AND gate 17c takes NAND of the clock CK from the oscillator 12a and the signal from the first PWM comparator 16a, and outputs an output of the NAND to the P-type MOSFET Qp1 through the first step-driver 18a.

The first PWM comparator 16a, the first AND gate 17c and the first step-driver 18a generate a first drive signal that drives the P-type MOSFET Qp1 to flow a current through the discharge lamp 3 at a pulse width corresponding to the current flowing through the discharge lamp 3 in less than a half cycle of the triangular wave signal CF (C1). The subtractor 19a, the second PWM comparator 16c, the second AND gate 17d and the second step-driver 18b generate a second drive signal that has substantially the same pulse width as that of the first drive signal and a phase difference of approximately 180 degrees therefrom, and drives the N-type MOSFET Qn1 to flow a current through the discharge lamp 3 in a direction reverse to that when the first drive signal is generated.

The first step-driver 18a turns on the P-type MOSFET Qp1 in two steps, and outputs a two-step gate drive signal to the gate of the P-type MOSFET Qp1. The second step-driver 18b turns on the N-type MOSFET Qn1 in two steps, and outputs a two-step gate drive signal to the gate of the N-type MOSFET Qn1.

Figure 2:
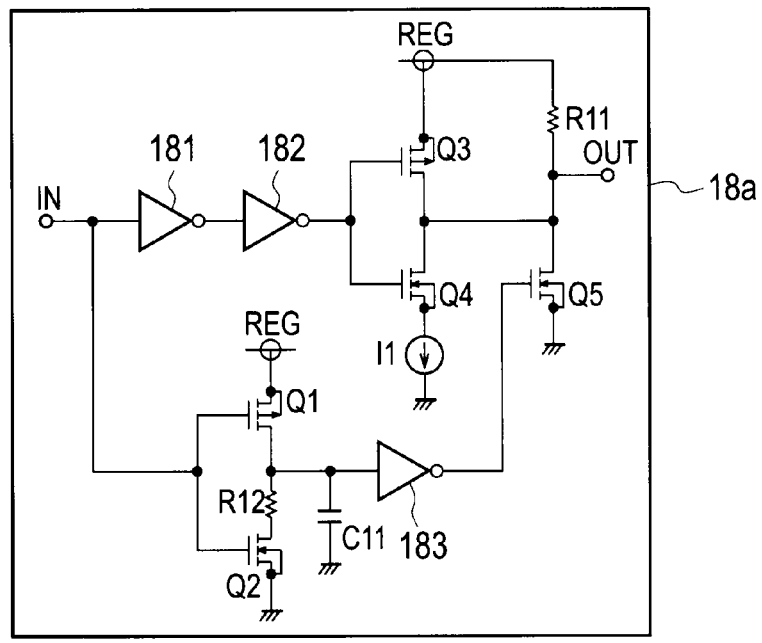
FIG. 2 is a circuit diagram of a first step-driver provided in the DC/AC converter according to Embodiment 1 of the present invention.

FIG. 2 is a circuit diagram of the first step-driver provided in the DC/AC converter shown in FIG. 1. The first step-driver 18a includes a first-step drive circuit, and a second-step drive circuit. The first-step drive circuit connects a constant current source I1 in series to a first CMOS inverter composed of a P-type MOSFET Q3 and an N-type MOSFET Q4, and outputs a drive signal slightly larger than a threshold voltage between the gate and source of the P-type MOSFET Qp1 to the gate of the P-type MOSFET Qp1. The second-step drive circuit connects a delay circuit to an output of a second CMOS inverter composed of a P-type MOSFET Q1 and an N-type MOSFET Q2, and outputs a drive signal, of which value becomes a predetermined one, to the gate of the P-type MOSFET Qp1.

Next, a description will be made of a more specific connection configuration. An input terminal IN is connected to a gate of the P-type MOSFET Q1 and a gate of the N-type MOSFET Q2. A source of the P-type MOSFET Q1 is connected to a power supply REG. A drain of the P-type MOSFET Q1 is connected to a drain of the N-type MOSFET Q2 through a resistor R12. A source of the N-type MOSFET Q2 is grounded. To a node of the P-type MOSFET Q1 and the resistor R12, one end of a capacitor C11 and an input end of an inverter 183 are connected. The other end of the capacitor C11 is grounded. An output end of the inverter 183 is connected to a gate of an N-type MOSFET Q5.

Moreover, the input terminal IN is connected through an inverter 181 and an inverter 182 to a gate of the P-type MOSFET Q3 and a gate of the N-type MOSFET Q4. A source of the P-type MOSFET Q3 is connected to the power supply REG. A drain of the P-type MOSFET Q3 is connected to a drain of the N-type MOSFET Q4. A source of the N-type MOSFET Q4 is grounded through the current source I1. The power supply REG is connected to a drain of the N-type MOSFET Q5 through a resistor R11. A source of the N-type MOSFET Q5 is grounded. A node of the P-type MOSFET Q3 and the N-type MOSFET Q4 is connected to a node of the resistor R11 and the N-type MOSFET Q5. An output OUT is taken out from the node of the resistor R11 and the drain of the N-type MOSFET Q5.

Figure 3:
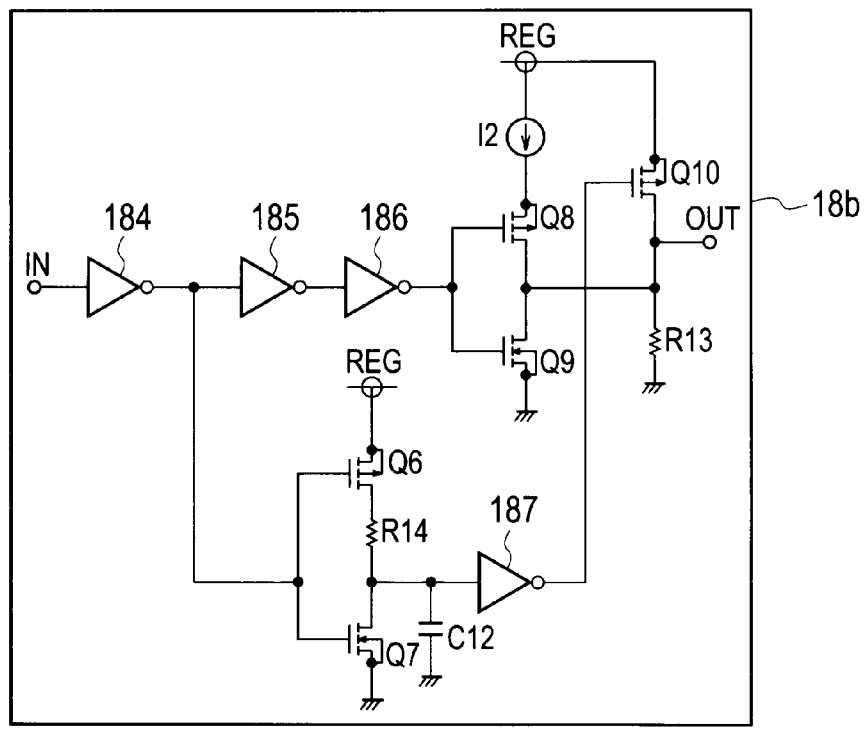
FIG. 3 is a circuit diagram of a second step-driver provided in the DC/AC converter according to Embodiment 1 of the present invention.

FIG. 3 is a circuit diagram of the second step-driver provided in the DC/AC converter shown in FIG. 1. The second stepdriver 18b includes a first-step drive circuit, and a second-step drive circuit. The first-step drive circuit connects a constant current source I2 in series to a third CMOS inverter composed of a P-type MOSFET Q8 and an N-type MOSFET Q9, and outputs a drive signal slightly larger than a threshold voltage between the gate and source of the N-type MOSFET Qn1 to the gate of the N-type MOSFET Qn1. The second-step drive circuit connects a delay circuit to an output of a fourth CMOS inverter composed of a P-type MOSFET Q6 and an N-type MOSFET Q7, and outputs a drive signal, of which value becomes a predetermined one, to the gate of the N-type MOSFET Qn1.

Next, a description will be made of a more specific connection configuration. In FIG. 3, an input terminal IN is connected to a gate of the P-type MOSFET Q6 and a gate of the N-type MOSFET Q7. A source of the P-type MOSFET Q6 is connected to a power supply REG. A drain of the P-type MOSFET Q6 is connected to a drain of the N-type MOSFET Q7 through a resistor R14. A source of the N-type MOSFET Q7 is grounded. To a node of the N-type MOSFET Q7 and the resistor R14, one end of a capacitor C12 and an input end of an inverter 187 are connected. The other end of the capacitor C12 is grounded. An output end of the inverter 187 is connected to a gate of a P-type MOSFET Q10.

Moreover, the input terminal IN is connected through an inverter 185 and an inverter 186 to a gate of the P-type MOSFET Q8 and a gate of the N-type MOSFET Q9. A source of the P-type MOSFET Q8 is connected to the power supply REG through the current source I2. A drain of the P-type MOSFET Q8 is connected to a drain of the N-type MOSFET Q9. A source of the N-type MOSFET Q9 is grounded. The power supply REG is connected to a source of the P-type MOSFET Q10. A drain of the P-type MOSFET Q10 is grounded through a resistor R13. A node of the P-type MOSFET Q8 and the N-type MOSFET Q9 is connected to a node of the resistor R13 and the P-type MOSFET Q10. An output OUT is taken out from the node of the drain of the P-type MOSFET Q10 and the resistor R13.

Next, a description will be made of operations of the DC/AC converter of Embodiment 1, which is configured as described above, while referring to operation waveforms of FIG. 4.

In FIG. 4, V_DRV1 is the output of the first step-driver 18a, V_DRV2 is the output of the second step-driver 18b, I_P is a primary-side current of the transformer T, I_Qp1 is a drain current of the P-type MOSFET Qp1, and I_Qn1 is a drain current of the N-type MOSFET Qn1.

Here, a description will be made of operations of the first step-driver 18a and the second step-driver 18b by using drive waveforms of the SW network, which are shown in FIG. 4, and operation waveforms when the SW network is driven at a resonant frequency. Here, the resonant frequency refers to a frequency at which the capacitors C3 and C4 and the reactor Lr, which compose the resonant circuit 9, resonate with each other.

In the first step-driver 18a shown in FIG. 2, at a time t1, a PWM signal of the H level, which is inputted to the input terminal IN, turns on the N-type MOSFET Q4 through the inverter 181 and the inverter 182. Then, a current flows along a route of: the power supply REG→the resistor R11→the N-type MOSFET Q4→the current source I1→the ground. Therefore, the first step-driver 18a outputs, as the output OUT, a voltage obtained by multiplying the resistor R11 and the current I1.

This voltage is slightly larger than the threshold voltage Vgs(th) between the gate and source of the P-type MOSFET Qp1. Therefore, the first step-driver 18a turns on the P-type MOSFET Qp1 in first-step, and a slight current flows through the P-type MOSFET Qp1.

Meanwhile, at the time t1, the PWM signal of the H level, which is inputted to the input terminal IN, turns on the N-type MOSFET Q2. Then, an electric charge stored in the capacitor C11 is discharged to the ground through the resistor R12 and the N-type MOSFET Q2. At this time, when a time determined by a time constant of the resistor R12 and the capacitor C11 elapses to reach a time t12, the inverter 183 outputs the H level to the gate of the N-type MOSFET Q5. Therefore, the N-type MOSFET Q5 is turned on, and a current flows along a route of: the power supply REG→the resistor R11→the N-type MOSFET Q5→the ground. Therefore, the first step-driver 18a outputs a voltage of a substantial ground level (L level) as the output OUT.

This voltage of the L level is fairly larger than the threshold voltage Vgs(th) between the gate and source of the P-type MOSFET Qp1. Therefore, the first step-driver 18a turns on the P-type MOSFET Qp1 in second-step, and a larger current than the current at the time of turning on the first-step flows through the P-type MOSFET Qp1.

At a time t2, the PWM signal of the L level, which is inputted to the input terminal IN of the first step-driver 18a, turns on the P-type MOSFET Q3 through the inverter 181 and the inverter 182. Then, a power supply voltage, that is, a voltage of the H level is outputted from the power supply REG through the P-type MOSFET Q3 to the output OUT. Moreover, at the time t2, the PWM signal of the L level, which is inputted to the input terminal IN of the first step-driver 18a, turns on the P-type MOSFET Q1. Then, the capacitor C11 is charged by the power supply REG, and the inverter 183 outputs a voltage of the L level to the gate of the N-type MOSFET Q5, and accordingly, the N-type MOSFET Q5 is off.

Next, in the second step-driver 18b shown in FIG. 3, at a time t3, a PWM signal of the H level, which is inputted to the input terminal IN, turns on the P-type MOSFET Q8 through the inverter 184, the inverter 185, and the inverter 186. Then, a current flows along a route of: the power supply REG→the current source I2→the P-type MOSFET Q8→the resistor R13→the ground. Therefore, the second step-driver 18b outputs, as the output OUT, a voltage obtained by multiplying the resistor R13 and the current I2.

This voltage is slightly larger than the threshold voltage Vgs(th) between the gate and source of the N-type MOSFET Qn1. Therefore, the second step-driver 18b turns on the N-type MOSFET Qn1 in first-step, and a slight current flows through the N-type MOSFET Qn1.

Meanwhile, at the time t3, the PWM signal of the H level, which is inputted to the input terminal IN, turns on the P-type MOSFET Q6 through the inverter 184. Then, a current flows along a route of: the power supply REG→the P-type MOSFET Q6→the resistor R14→the capacitor C12. Therefore, the capacitor C12 is charged at a time constant determined by the resistor R14 and the capacitor C12. At this time, when a time determined by the time constant of the resistor R14 and the capacitor C12 elapses to reach a time t34, the inverter 187 outputs a voltage of the L level to the gate of the P-type MOSFET Q10. Therefore, the P-type MOSFET Q10 is turned on, and a current flows along a route of: the power supply REG→the P-type MOSFET Q10→the resistor R13→the ground. Therefore, the second step-driver 18b outputs a voltage of the H level as the output OUT.

This H-level voltage of the second step-driver 18b is fairly larger than the threshold voltage Vgs(th) between the gate and source of the N-type MOSFET Qn1. Therefore, the second step-driver 18b turns on the N-type MOSFET Qn1 in second-step, and a larger current than the current at the time of turning on the first-step flows through the N-type MOSFET Qn1.

At a time t3', the PWM signal of the L level, which is inputted to the input terminal IN of the second step-driver 18b, turns on the N-type MOSFET Q9 through the inverter 184, the inverter 185, and the inverter 186. Then, a voltage of the ground level (L level) is outputted to the output OUT. Moreover, at the time t3', the PWM signal of the L level, which is inputted to the input terminal IN of the second step-driver 18b, turns on the N-type MOSFET Q7 through the inverter 184. Then, the capacitor C12 is discharged, and the inverter 187 outputs a voltage of the H level to the gate of the P-type MOSFET Q10, and accordingly, the P-type MOSFET Q10 is off.

Figure 5:
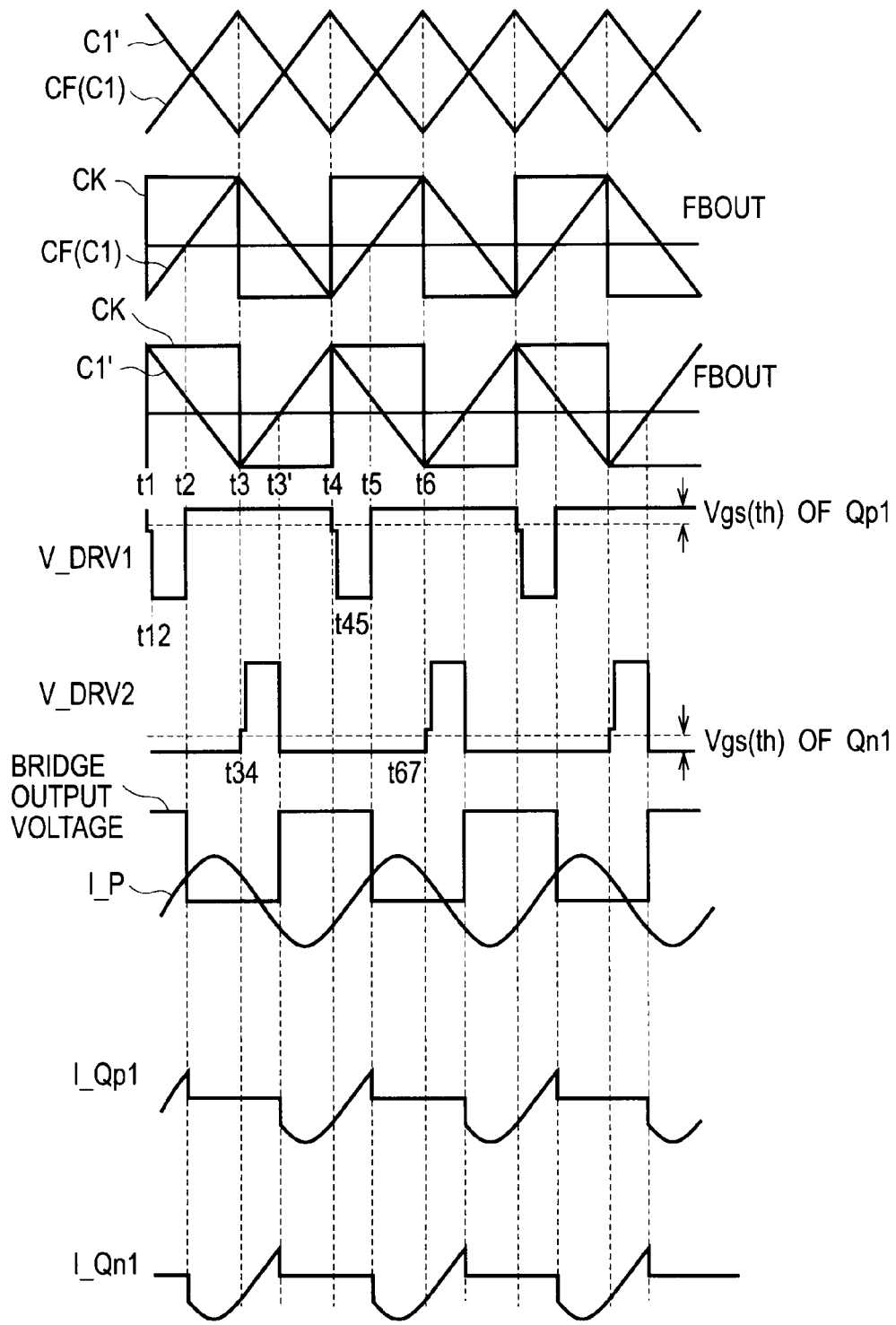
FIG. 5 is a chart showing drive waveforms of the SW network provided in the DC/AC converter according to Embodiment 1 of the present invention, and operation waveforms when the SW network is driven in a lagging phase range of a resonance.
Figure 6:
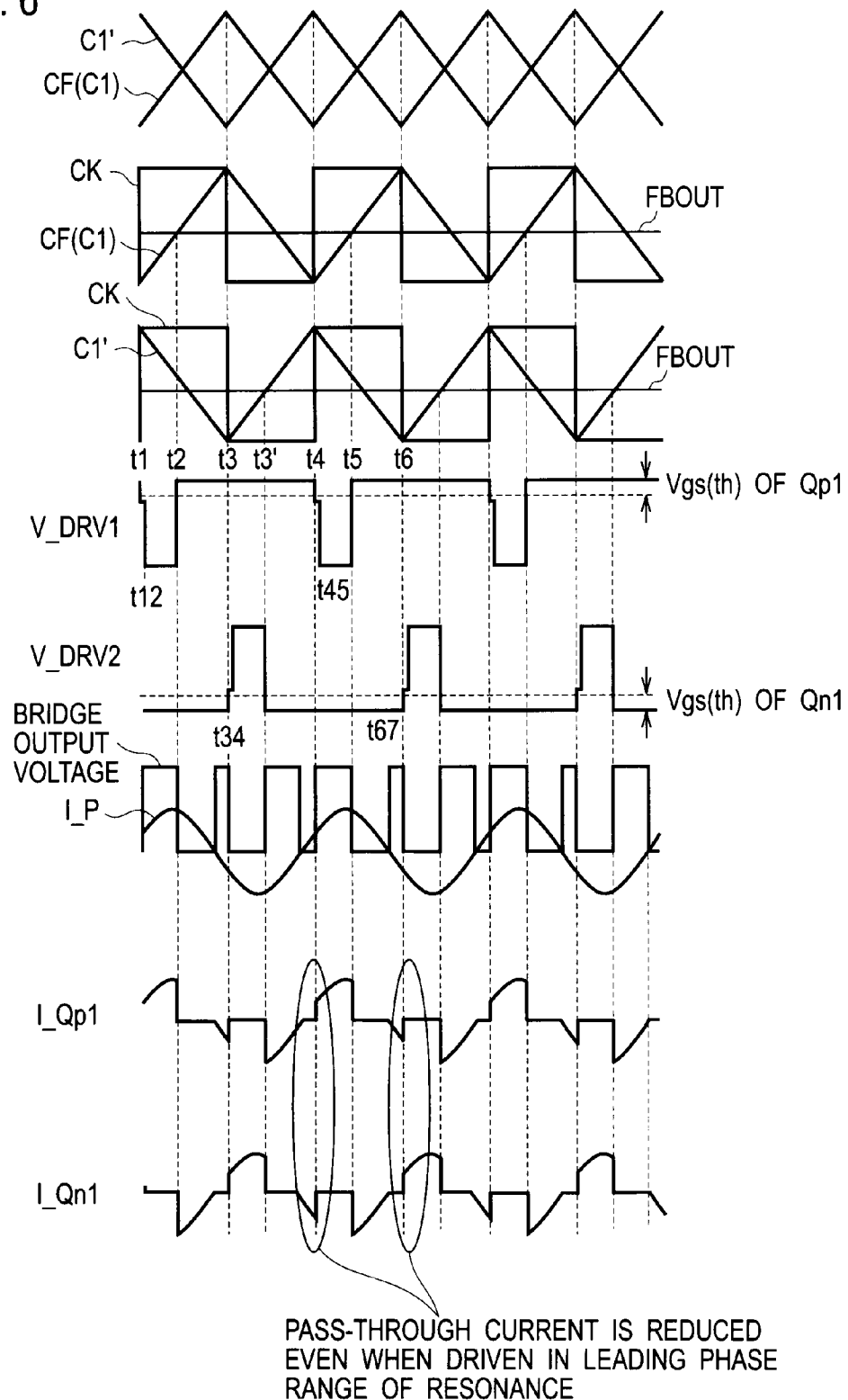
FIG. 6 is a chart showing drive waveforms of the SW network provided in the DC/AC converter according to Embodiment 1 of the present invention, and operation waveforms when the SW network is driven in a leading phase range of the resonance.
Figure 7:
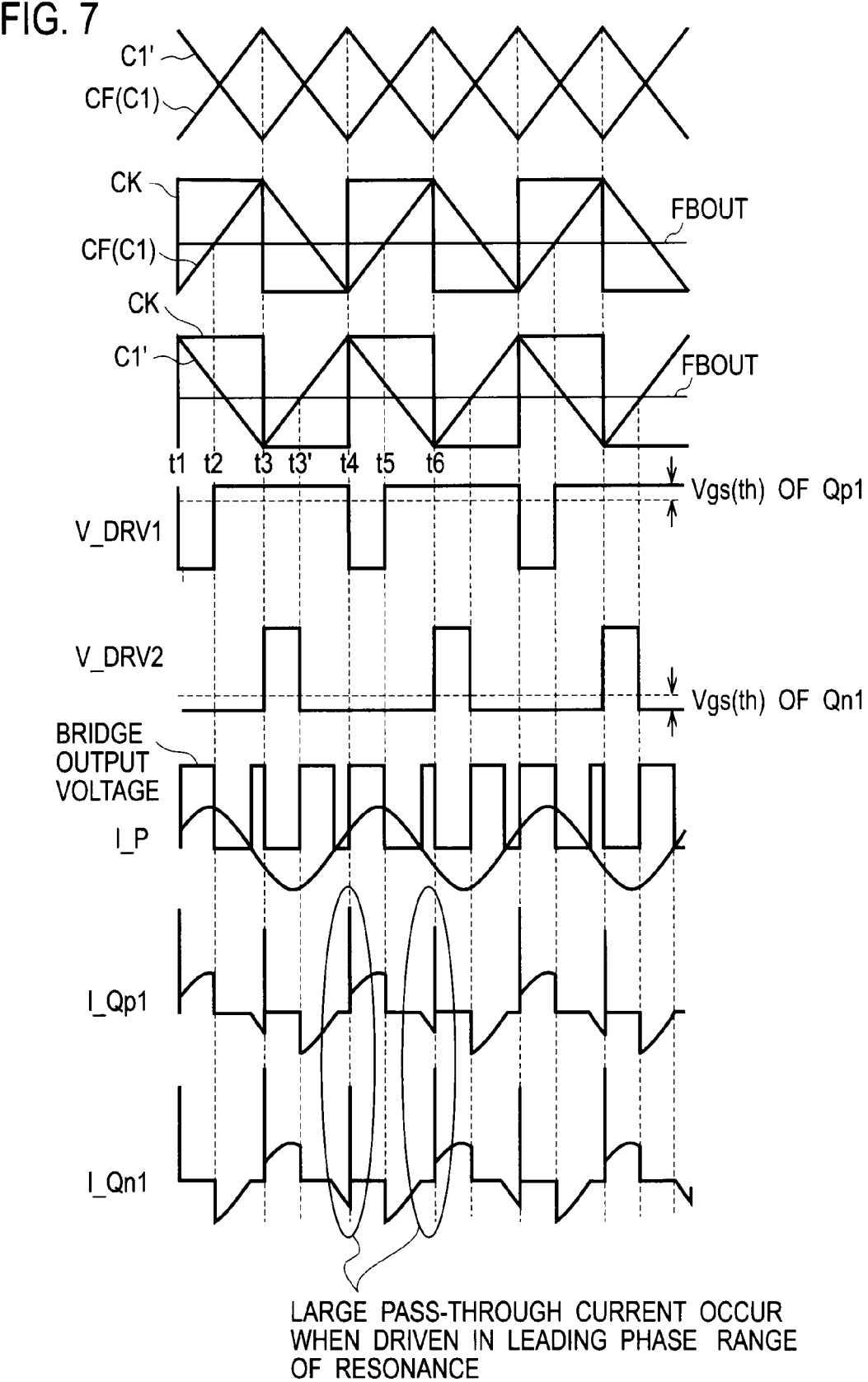
FIG. 7 is a chart showing drive waveforms of an SW network provided in a conventional DC/AC converter, and operation waveforms when the SW network is driven in the leading phase range of the resonance.

FIG. 5 is a chart showing drive waveforms of the SW network provided in the DC/AC converter shown in FIG. 1, and operation waveforms when the SW network is driven in a lagging phase range of the resonance. FIG. 6 is a chart showing drive waveforms of the SW network provided in the DC/AC converter shown in FIG. 1, and operation waveforms when the SW network is driven in a leading phase range of the resonance. FIG. 7 is a chart showing drive waveforms of an SW network provided in a conventional DC/AC converter, and operation waveforms when the SW network is driven in the leading phase range of the resonance.

In the conventional DC/AC converter shown in FIG. 7, when the SW network is driven in the leading phase range of the resonance, a large pass-through current has occurred at the time when the P-type MOSFET Qp1 is turned on and at the time when the N-type MOSFET Qn1 is turned on.

As opposed to this, in the DC/AC converter of Embodiment 1, which is shown in FIG. 6, when the SW network is driven in the leading phase range of the resonance, the pass-through current, which occurs at the time when the P-type MOSFET Qp1 is turned on and at the time when the N-type MOSFET Qn1 is turned on, is reduced to a great extent. Specifically, the step-driver 18*a* turns on the P-type MOSFET Qp1 in two steps, and the step-driver 18*b* turns on the N-type MOSFET Qn1 in two steps. Accordingly, the pass-through current, which flows by a reverse recovery time of each of the parasitic diodes present in the P-type MOSFET Qp1 and the N-type MOSFET Qn1, can be reduced. As a result, in Embodiment 1, the breakage of the P-type MOSFET Qp1 and the N-type MOSFET Qn1, which is caused by the large pass-through current, is prevented.

Therefore, the DC/AC converter of Embodiment 1 is suitable for composing a discharge lamp lighting inverter with a high input voltage, for example, an input voltage of 100V to 400V, which uses high withstand-voltage MOSFETs in each of which the reverse recovery time of the parasitic diode is longer.

Embodiment 2

The DC/AC converter of Embodiment 1, which is shown in FIG. 1, uses the half-bridge-type SW network 7 composed of the first series circuit of the P-type MOSFET Qp1 and the N-type MOSFET Qn1.

Figure 8:
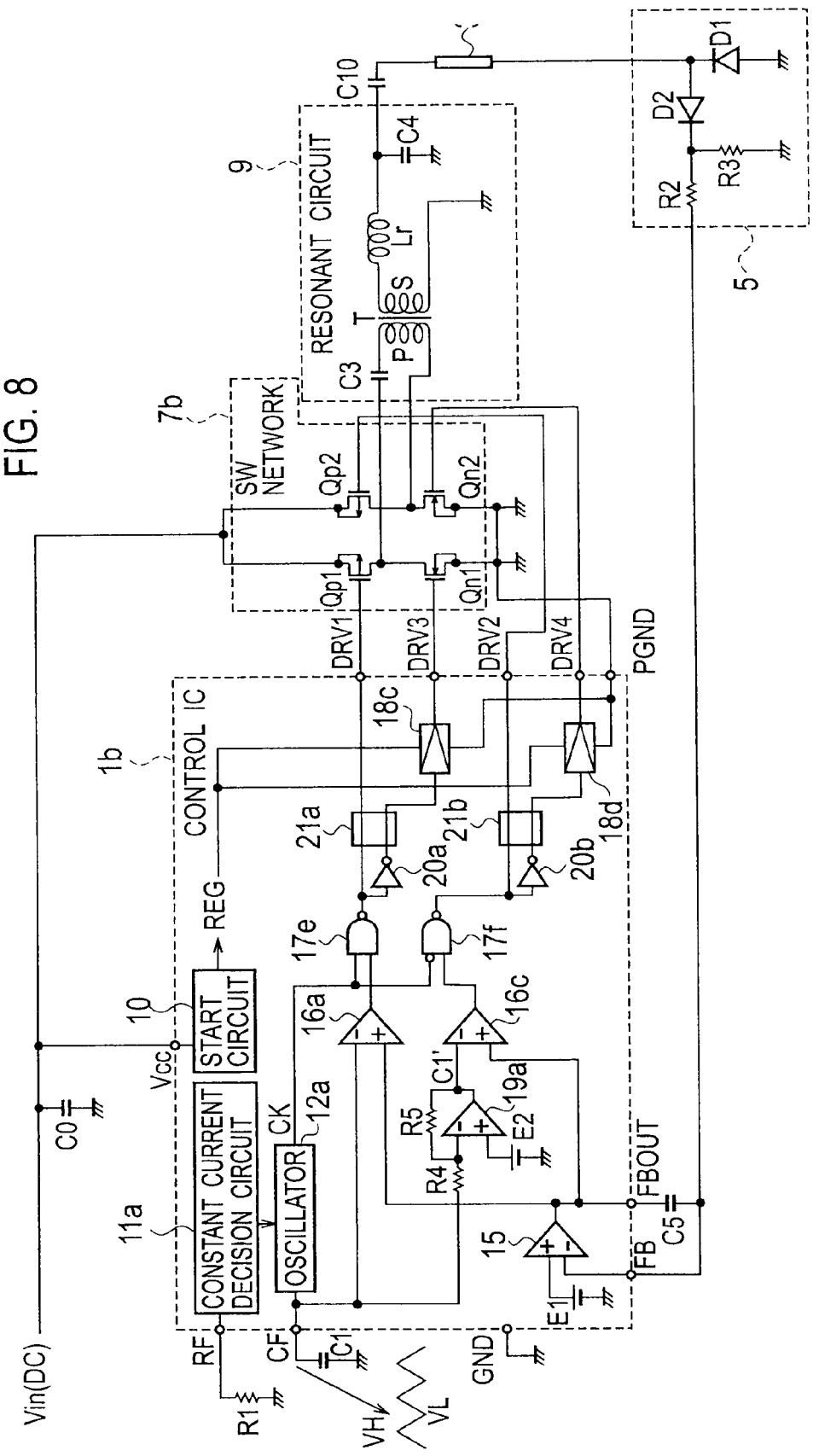
FIG. 8 is a circuit diagram showing a configuration of a DC/AC converter according to Embodiment 2 of the present invention.

As opposed to this, a DC/AC converter of Embodiment 2 of the present invention, which is shown in FIG. 8, is characterized by using a full-bridge-type switching circuit (SW network) 7*b* composed of the first series circuit formed of the first P-type MOSFET Qp1 and the first N-type MOSFET Qn1, and of a second series circuit formed of a second P-type MOSFET Qp2 and a second N-type MOSFET Qn2.

The series circuit of the capacitor C3 and the primary winding P of the transformer T is connected between the node of the first P-type MOSFET Qp1 and the first N-type MOSFET Qn1 and a node of the second P-type MOSFET Qp2 and the second N-type MOSFET Qn2. The gate of the first P-type MOSFET Qp1 is connected to the DRV1 terminal. The gate of the first N-type MOSFET Qn1 is connected to a DRV3 terminal. A gate of the second P-type MOSFET Qp2 is connected to the DRV2 terminal. A gate of the second N-type MOSFET Qn2 is connected to a DRV4 terminal.

A control IC 1*b* is an IC in which the control IC 1 shown in FIG. 1 further includes inverters 20*a* and 20*b*, first and second dead time creation circuits 21*a* and 21*b*, and third and fourth step-drivers 18*c* and 18*d*. The third and fourth step-drivers 18*c* and 18*d* have the same configurations as that of the second step-driver 18*b* shown in FIG. 1 and FIG. 3.

The first dead time creation circuit 21*a* directly outputs a NAND signal, which is from a NAND gate 17*e*, to the first P-type MOSFET Qp1, and delays an inverted signal, which is obtained by inverting the NAND signal from the NAND gate 17*e* in the inverter 20*a*, by a predetermined dead time DT, and outputs the inverted signal thus delayed to the third step-driver 18*c*. The third step-driver 18*c* turns on the N-type MOSFET Qn1 in two steps based on the signal from the first dead time creation circuit 21*a*, and outputs a two-step gate drive signal to the gate of the first N-type MOSFET Qn1.

The second dead time creation circuit 21*b* directly outputs a logic signal, which is from a logic gate 17*f*, to the second P-type MOSFET Qp2, and delays an inverted signal, which is obtained by inverting the logic signal from a logic gate 17*f* in the inverter 20*b*, by the predetermined dead time DT, and outputs the inverted signal thus delayed to the fourth step-driver 18*d*. The fourth step-driver 18*d* turns on the N-type MOSFET Qn2 in two steps based on the signal from the second dead time creation circuit 21*b*, and outputs a two-step gate drive signal to the gate of the second N-type MOSFET Qn2.

Figure 9:
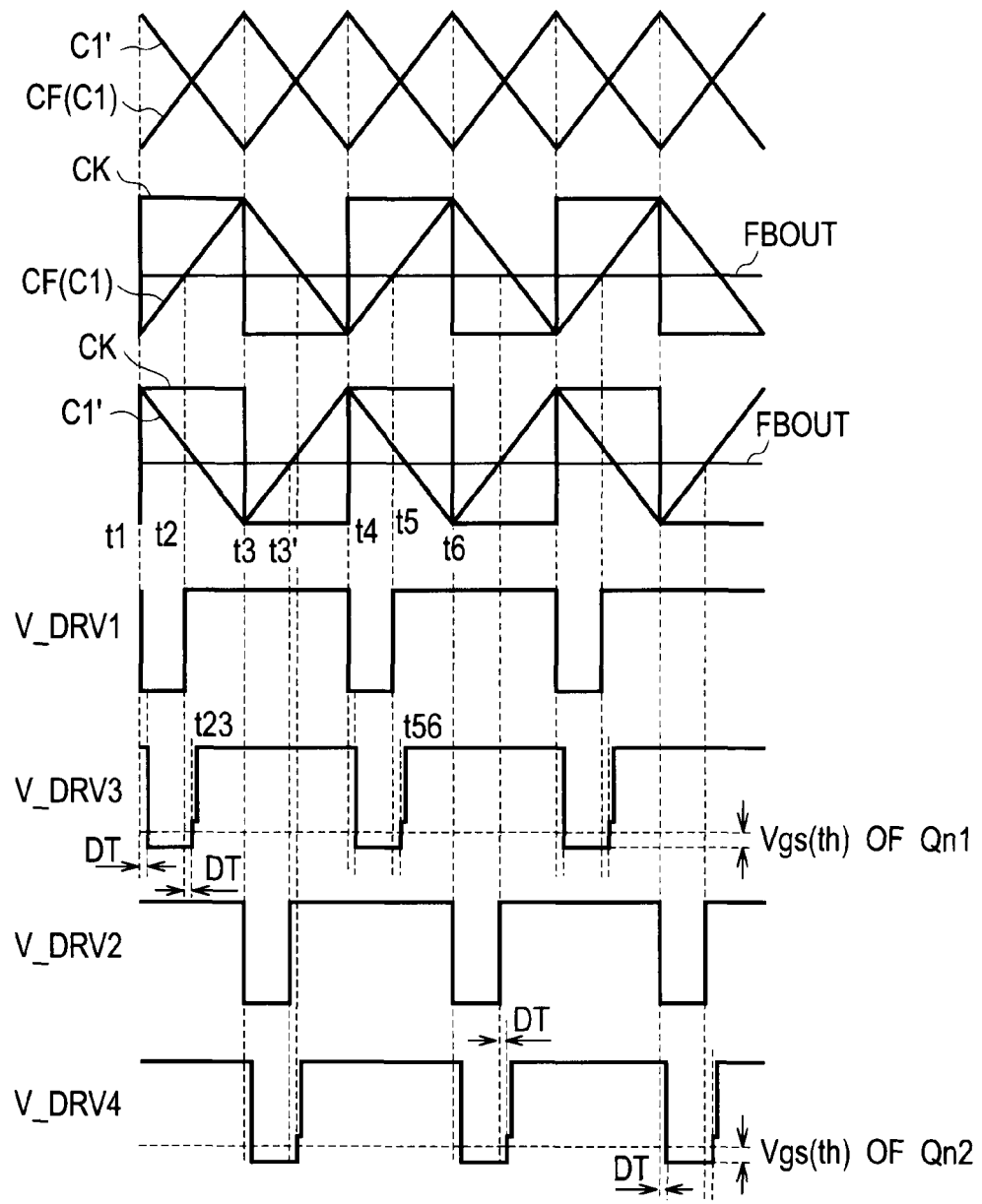
FIG. 9 is a chart showing drive waveforms of an SW network provided in the DC/AC converter according to Embodiment 2 of the present invention.

FIG. 9 is a chart showing drive waveforms of the SW network 7*b* provided in the DC/AC converter shown in FIG. 8. In FIG. 9, reference symbol DT denotes the dead time.

In FIG. 8, at a time t1, when the first P-type MOSFET Qp1 and the second N-type MOSFET Qn2 are turned on, a current flows along a route of: the power supply Vin→Qp1→C3→P→Qn2, the ground. Thereafter, at a time t2, when the first P-type MOSFET Qp1 is turned off, a recovery current flows through the parasitic diode of the first P-type MOSFET Qp1 along a route of: the ground→Qn2→P→C3→the parasitic diode of the first P-type MOSFET Qp1→the power supply Vin. If the N-type MOSFET Qn1 is turned on at the time when this recovery current flows therethrough, then the pass-through current flows. Therefore, the N-type MOSFET Qn1 is turned on in two steps by using the third step-driver 18*c* as a drive circuit of the N-type MOSFET Qn1, whereby the reduction of the pass-through current is achieved.

Next, at a time t3, when the second P-type MOSFET Qp2 and the first N-type MOSFET Qn1 are turned on, a current flows along a route of: the power supply Vin→Qp2→P→C3→Qn1→the ground. Thereafter, at a time t3', when the second P-type MOSFET Qp2 is turned off, a recovery current flows through the parasitic diode of the second P-type MOSFET Qp2 along a route of: the ground→Qn1→C3→P→the parasitic diode of the second P-type MOSFET Qp2→the power supply Vin. If the N-type MOSFET Qn2 is turned on at the time when this recovery current flows therethrough, then the pass-through current flows through. Therefore, the N-type MOSFET Qn2 is turned on in two steps by using the fourth step-driver 18*d* as a drive circuit of the N-type MOSFET Qn2, whereby the reduction of the pass-through current is achieved. As a result, in Embodiment 2, the breakage of the first and second P-type MOSFETs Qp1 and Qp2 and the first and second N-type MOSFETs Qn1 and Qn2, which is caused by the large pass-through current, is prevented.

What is claimed is:

1. A DC/AC converter for converting a direct current into an alternating current, and supplying power to a load, the DC/AC converter comprising:

a resonant circuit including a transformer having a primary winding and a secondary winding and at least one capacitor, in which the capacitor is connected to at least one of the primary winding and secondary winding of the transformer, and an output terminal to which the load is to be connected is provided on the secondary winding side;

a switching circuit connected to both ends of a direct current power supply and having a bridge configuration composed of switching elements for flowing a current through the primary winding of the transformer and the capacitor in the resonant circuit; and a control circuit that turns on/off the switching elements by a pair of drive signals, and flows a current through the load bidirectionally, thereby performs a PWM control for the current flowing through the load, wherein the control circuit includes step drive circuits which turn on the switching elements in steps, and the step drive circuits are provided so as to correspond to at least one of the switching elements.

2. The DC/AC converter according to claim 1, wherein each of the step drive circuits includes:

a first-step drive circuit that connects a constant current source in series to a first CMOS inverter, and outputs a first drive signal slightly larger than a threshold voltage of the corresponding switching element to the corresponding switching element; and a second-step drive circuit that connects a delay circuit to an output of a second CMOS inverter, and outputs a second drive signal, of which value becomes a predetermined one, to the corresponding switching element.

3. The DC/AC converter according to claim 1, wherein the switching circuit is a half-bridge circuit composed of two switching elements, and each of the step drive circuits provided so as to correspond to each of the two switching elements turns on each of the two switching elements in steps.

4. The DC/AC converter according to claim 1, wherein the switching circuit is a full-bridge circuit comprising:

a first low-side switching element and a first high-side switching element, which are connected in series to each other; and a second low-side switching element and a second high-side switching element, which are connected in series to each other, and the step drive circuits provided so as to individually correspond to the first low-side switching element and the second low-side switching element turn on the first low-side switching element and the second low-side switching element, respectively in steps.

5. The DC/AC converter according to claim 2, wherein the switching circuit is a half-bridge circuit composed of two switching elements, and each of the step drive circuits provided so as to individually correspond to the two switching elements turns on each of the two switching elements in steps.

6. The DC/AC converter according to claim 2, wherein the switching circuit is a full-bridge circuit comprising:

a first low-side switching element and a first high-side switching element, which are connected in series to each other; and a second low-side switching element and a second high-side switching element, which are connected in series to each other, and the step drive circuits provided so as to individually correspond to the first low-side switching element and the second low-side switching element turn on the first low-side switching element and the second low-side switching element, respectively in steps.

* * * * *